H. A. MASON.
DUST CAP FOR TIRE VALVES.
APPLICATION FILED MAR. 15, 1915.
1,157,564.
Patented Oct. 19, 1915.
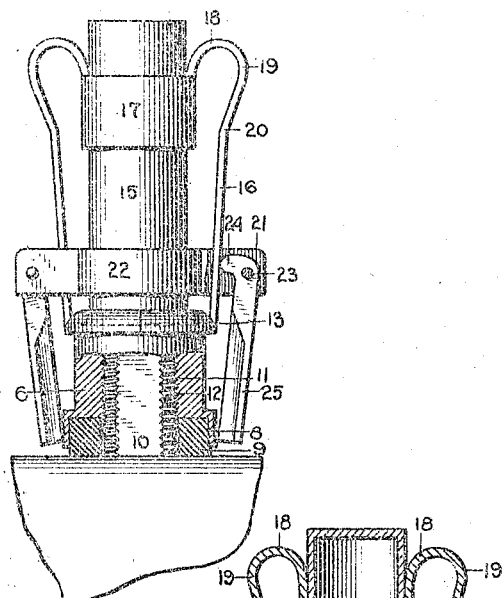
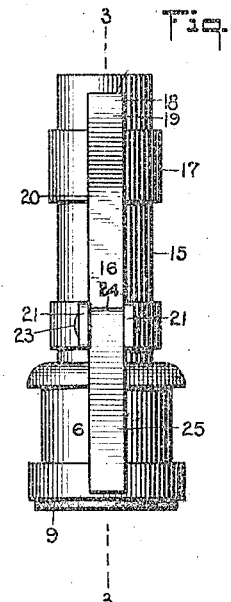
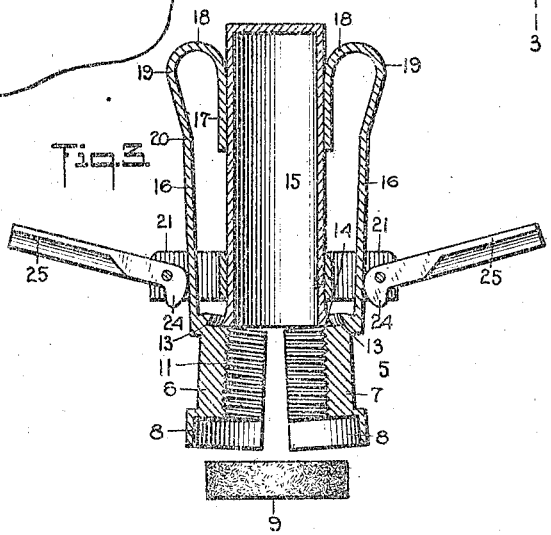
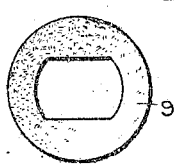
WITNESSES
INVENTOR
Hosea A. Mason
BY
ATTORNEYS

UNITED STATES PATENT OFFICE.

HOSEA ALFRED MASON, OF TAUNTON, MASSACHUSETTS, ASSIGNOR OF ONE-FOURTH TO STEPHEN G. O'NEIL AND ONE-FOURTH TO WILLIAM E. QUIGLEY, BOTH OF TAUNTON, MASSACHUSETTS.

DUST-CAP FOR TIRE-VALVES.

1,157,564.  Specification of Letters Patent.  Patented Oct. 19, 1915.

Application filed March 15, 1915. Serial No. 14,550.

*To all whom it may concern:*

Be it known that I, HOSEA A. MASON, a citizen of the United States, and a resident of Taunton, in the county of Bristol and State of Massachusetts, have invented a new and Improved Dust-Cap for Tire-Valves, of which the following is a full, clear, and exact description.

My invention has for its object to provide a dust cap for tire valves which may be instantly removed from the valve without the necessity of unscrewing.

The dust cap is constructed with a split nut, the parts for which have recesses for receiving a washer on the valve, these split nut parts being held away from each other by springs and which are moved into engagement with the valve by cams provided for this purpose.

Additional objects of the invention will appear in the following specification in which the preferred form of my invention is disclosed.

In the drawings similar reference characters refer to similar parts in all the views in which—

Figure 1 is a side elevation showing how my dust cap is applied to a tire valve, parts of the cap being broken away to illustrate the construction; Fig. 2 is an end view of the cap shown in Fig. 1; Fig. 3 is a sectional view on the line 3—3 of Fig. 2; and Fig. 4 is a face view of a washer used with my dust cap.

By referring to the drawings it will be seen that a split nut 5 is provided having parts 6 and 7 with annular recesses 8 at their lower ends for receiving a soft washer 9 which is normally disposed around the tire valve 10. It will be understood that when the parts 6 and 7 of the split nut 5 are moved apart as illustrated in Fig. 3 of the drawings, the device may be disposed over the valve 10 so that the soft washer 9 will be disposed in position to be inclosed by the split nut parts 6 and 7 at their recesses 8 when the split nut parts 6 and 7 are brought together as illustrated in Fig. 1 of the drawings, the threads 11 of the split nut meshing with the threads 12 of the valve 10 to firmly hold the split nut 5 on the said valve while making it possible to remove the device by the outward movement of the split nut parts 6 and 7 to free the split nut threads 11 from the valve threads 12.

The split nut 5 not only has annular recesses 8 at its lower end for receiving the soft washer 9 but it also has at its upper end annular recesses 13 which are V-shaped in cross section for receiving the outwardly extending bead 14 at the lower end of the cap 15, the inward movement of the split nut serving to engage the split nut parts 6 and 7 at the recesses 13 with the cap 15 at its bead 14 thereby firmly securing the split nut to the body of the cap 15, the split nut 5 forming a continuation of the said cap. The split nut parts 6 and 7 are held yieldingly away from each other by the springs 16, these springs 16 being mounted on a collar 17 secured to the cap 15 at a distance from the bead 14, the springs extending from the collar 17 upwardly at 18 and then outwardly and downwardly at 19, the springs 16 having shoulders at 20 from which the springs 16 extend downwardly to the split nut parts 6 and 7, to which they are secured, there being two springs 16, one secured to each of the parts 6 and 7. The springs 16 are preferably constructed with the shoulders 20 as it has been found that with this construction, great power may be obtained with springs of light construction. Each of the springs 16 extends downward between a pair of arms 21, these arms 21 serving as guides and being supported by a collar 22 which is secured around the cap 15 adjacent the bead 14. Disposed at the outer sides of the springs 16 and fulcrumed to the arms 21 at 23, there are cams 24 for engaging the springs 16 to push the springs inward and with them the split nut parts 6 and 7, so that the split nut parts 6 and 7 will be disposed in position where their threads 11 will engage the thread 12 on the valve 10. The cams 24 depend from their pivots 23 when the cams are moved to permit the split nut parts 6 and 7 to move away from each other, there being arms 25 secured to the cams 24 which, when pressed downwardly, as illustrated in Fig. 1 of the drawings, serve to move the cams 24 inward and upward to press the springs 16 inwardly as set forth, and with the split nut parts 6 and 7 at their recesses 13 engaging the cap 15 at its bead 14.

Having thus described my invention I claim as new and desire to secure by Letters Patent:

1. In a device of the class described, a cap, a split nut extending from an end of the cap, and means mounted on the cap for holding the parts of the split nut together with an end of the split nut disposed against the said end of the cap.

2. In a device of the class described, a cap, a split nut having one set of ends disposed at an end of the cap, means mounted on the cap for holding the parts of the split nut together and against the cap, the parts of the split nut having at their other ends means for receiving a washer.

3. In a device of the class described, a cap having an annular bead, a split nut, the parts of which have at one set of ends recesses for receiving the annular bead, and means for holding the parts of the split nut together and with the bead in the recesses.

4. In a device of the class described, a cap, a split nut extending from an end of the cap, supporting means mounted on the cap for yieldingly holding the ends of the split nut at the said end of the cap, and means for engaging the supporting means for holding the parts of the split nut together and against an end of the cap.

5. In a device of the class described, a cap having an annular bead, a split nut, the parts of which have at one set of ends recesses for receiving the annular bead, and at the other set of ends recesses for receiving a washer, and means for holding the parts of the split nut together and with the bead in the first mentioned recesses.

6. In a device of the class described, a cap, two springs secured to the cap, a split nut, the parts of which are carried by the springs, and means for engaging the springs for holding the parts of the split nut together at one end of the cap.

7. In a device of the class described, a cap having a bead at one end, two springs secured to the cap, a split nut, the parts of which have recesses for receiving the bead, the parts of the split nut being carried by the springs and means for engaging the springs for holding the parts of the split nut together at one end of the cap.

8. In a device of the class described, a cap, two springs secured to the cap, a split nut, the parts of which are carried by the springs, arms extending from the cap serving as guides for the springs and cams pivoted to the arms for engaging the springs to hold the parts of the split nut together at one end of the cap.

9. In a device of the class described, a cap having a bead, a split nut, the parts of which have recesses for receiving the bead, two springs mounted on the cap and secured for carrying the parts of the split nut, arms extending from the cap serving as guides for the springs, cams pivoted to the arms for engaging the springs to hold the parts of the split nut together at one end of the cap, there being additional recesses in the parts of the split nut for receiving a washer.

In testimony whereof I have signed my name to this specification in the presence of the two subscribing witnesses.

HOSEA ALFRED MASON.

Witnesses:
ALBERT R. WHITEHEAD,
PETER F. QUIGLEY.